United States Patent [19]

Hao et al.

[11] Patent Number: 6,014,752
[45] Date of Patent: Jan. 11, 2000

[54] METHOD AND APPARATUS FOR FULLY CONTROLLABLE INTEGRATED CIRCUIT INTERNAL CLOCK

[75] Inventors: Hong Hao, Sunnyvale; Kanti Bhabuthmal, Fremont, both of Calif.

[73] Assignee: Sun Mircosystems, Inc., Mountain View, Calif.

[21] Appl. No.: 08/379,159

[22] Filed: Jan. 27, 1995

[51] Int. Cl.[7] .............................. G06F 1/04; G06F 11/00
[52] U.S. Cl. ...................... 713/500; 395/500.05
[58] Field of Search ............................. 395/550, 183.06, 395/183.1, 183.01, 500.02, 500.05, 500.07; 371/22.5, 22.6; 713/500, 600, 60; 714/733, 734, 30, 25, 34

[56] References Cited

U.S. PATENT DOCUMENTS

| | | | |
|---|---|---|---|
| 5,179,696 | 1/1993 | Shouda | 395/183.01 |
| 5,253,255 | 10/1993 | Carbine | 371/22.6 |
| 5,394,403 | 2/1995 | Klein | 371/21.1 |

OTHER PUBLICATIONS

Holdbrook, et al, "MicroSPARC: A Case–Study of Scan Based Debug", International Test Conference, Washington, D.C., Oct. 1994, pp. 70–75.

IEEE Standard Test Access Port and Boundary Scan Architecture, IEEE Std. 1149.1–1990.

*Primary Examiner*—Thomas M. Heckler
*Attorney, Agent, or Firm*—Pennie & Edmonds LLP

[57] ABSTRACT

A clock generation and control circuit to debug an integrated circuit includes a multiplexer connected to a set of input lines that carry a set of clock signals. The multiplexer selects one of the input lines in response to a select signal generated by a decode circuit. A control circuit provides input signals to the decode circuit. The control circuit specifies a disabled output clock signal in response to a stop signal applied to a single external pin of the integrated circuit. Alternately, the control circuit specifies a disabled output clock signal through a test access port of the integrated circuit. Debug operations are executed while the output clock signal is disabled.

20 Claims, 9 Drawing Sheets

METHOD AND APPARATUS FOR FULLY CONTROLLABLE INTEGRATED CIRCUIT INTERNAL CLOCK

BACKGROUND OF THE INVENTION

1. Technical Field

This invention pertains to integrated circuits, and more specifically to an integrated circuit method and apparatus for providing a fully controllable internal clock which can be manipulated to allow an integrated circuit to run in different modes and at different speeds, and thereby provide more effective debugging of the integrated circuit.

2. Prior Art

Testing of very large scale integrated circuit (VLSI) devices is complex. Nevertheless, it is essential to verify that a given circuit functions properly in order to provide the end user with a system which will meet specified needs.

The internal clock is an essential and one of the most important parts of any synchronous VLSI chip. A fully controllable integrated circuit internal clock is very important in integrated circuit debugging. By manipulating the internal clock in different ways, an integrated circuit chip can be controlled to run in different modes and at different speeds during debug operations. These modes can be used either on the tester or in a system environment. Critical information about the state of the integrated circuit can be obtained from such clock manipulation.

Integrated circuit internal clocks are operated in the prior art according to the boundary scan test method. In the boundary scan test method, various test data is serially loaded into locations within the integrated circuit and then the integrated circuit is operated in a conventional fashion based upon the serially loaded data, and the resultant output data is verified. The boundary scan test method is described, for example, in "IEEE Standard Test Access Port and Boundary-Scan Architecture", IEEE STD 1149.1-1990 (also referred to herein as "IEEE 1149.1").

In IEEE 1149.1, it is specified that the clock input must be capable of being stopped at 0 indefinitely, without causing any change to the state of the test logic. The clock is stopped, for example, when a test system needs to fetch data from backup memory such as a disc.

One implementation of IEEE 1149.1 was incorporated into the microSPARC™ integrated circuit from Sun Microsystems, Inc., the assignee of this application, and was described in "microSPARC™: A Case-Study of Scan Based Debug", IEEE International Test Conference, October 1994, pages 70–75. The microSPARC™ device takes a high-frequency waveform from either the on-chip phase locked loop (PLL) or the external clock input pins, and uses it to generate the internal clock waveforms as well as the sbclk waveform which clocks the external system bus. Under the control of on-chip register bits, which are accessible only by IEEE 1149.1 scan operations, clocks are started and stopped in a variety of ways, to facilitate debug and test. The microSPARC clock controller includes a simple 32-bit on-chip Extended Cycle Counter (XCC) for precise control of system clocking. The XCC is a simple binary counter, accessible only by scan, which increments on sbclk positive edges. To stop a clock in the microSPARC device, a stop clock CCR bit is set. To start the clock again, the start clock CCR bit is set. In the microSPARC™ device, a number of clock functions are supported, including a single step operation, in which a single clock pulse is generated, counting the number of clock cycles which have been issued between any two points in time, issuing a plurality of N clock pulses, stopping the clock on either external or internal events, or N cycles after an internal event, as well as on the nth clock cycle in which an internal event is detected.

SUMMARY

The invention is a clock generation and control circuit used during normal integrated circuit and during debugging operations. The apparatus of the invention includes a multiplexer connected to a set of input lines that carry a set of clock signals. The multiplexer selects one of the input lines in response to a select signal generated by a decode circuit. A control circuit provides input signals to the decode circuit. The control circuit specifies a disabled output clock signal in response to a stop signal applied to a single external pin of the integrated circuit. Alternately, the control circuit specifies a disabled output clock signal through a test access port of the integrated circuit. Debug operations are executed while the output clock signal is disabled.

The method of the invention includes the step of selecting a disabled output clock signal from a plurality of clock signals in response to a select command. The selecting step may be implemented by alternately selecting the disabled output clock signal in response to a stop signal applied to a single external pin of the integrated circuit, or in response to a scan stop signal generated through a test access port of the integrated circuit. Debug operations are executed while the output clock signal is disabled.

Known prior art is incapable of selecting a disabled internal clock from a single external pin. Consequently, prior art devices use multiple external pins to execute this function, thereby increasing the cost and complexity of prior art devices. When the single external pin is used, the clock is disabled within one falling edge of a clock signal. In the prior art, a latency of more than one cycle is needed. The improved latency achieved with the invention results in a greater capability to capture an error state in an integrated circuit that is being debugged.

The invention's use of a scan stop signal generated through a test access port of the integrated circuit permits the debugging of a chip that is deeply embedded into a board or system. The TCK clock provided by IEEE 1149.1 may be used as the controlled clock source. In this implementation, an existing clock is used, thereby obviating the need for a separate clock. This approach also eliminates the requirement that the on-chip phase-locked loop stay phase-locked while the internal clock is stopped.

DETAILED DESCRIPTION OF THE INVENTION

Figure 1:
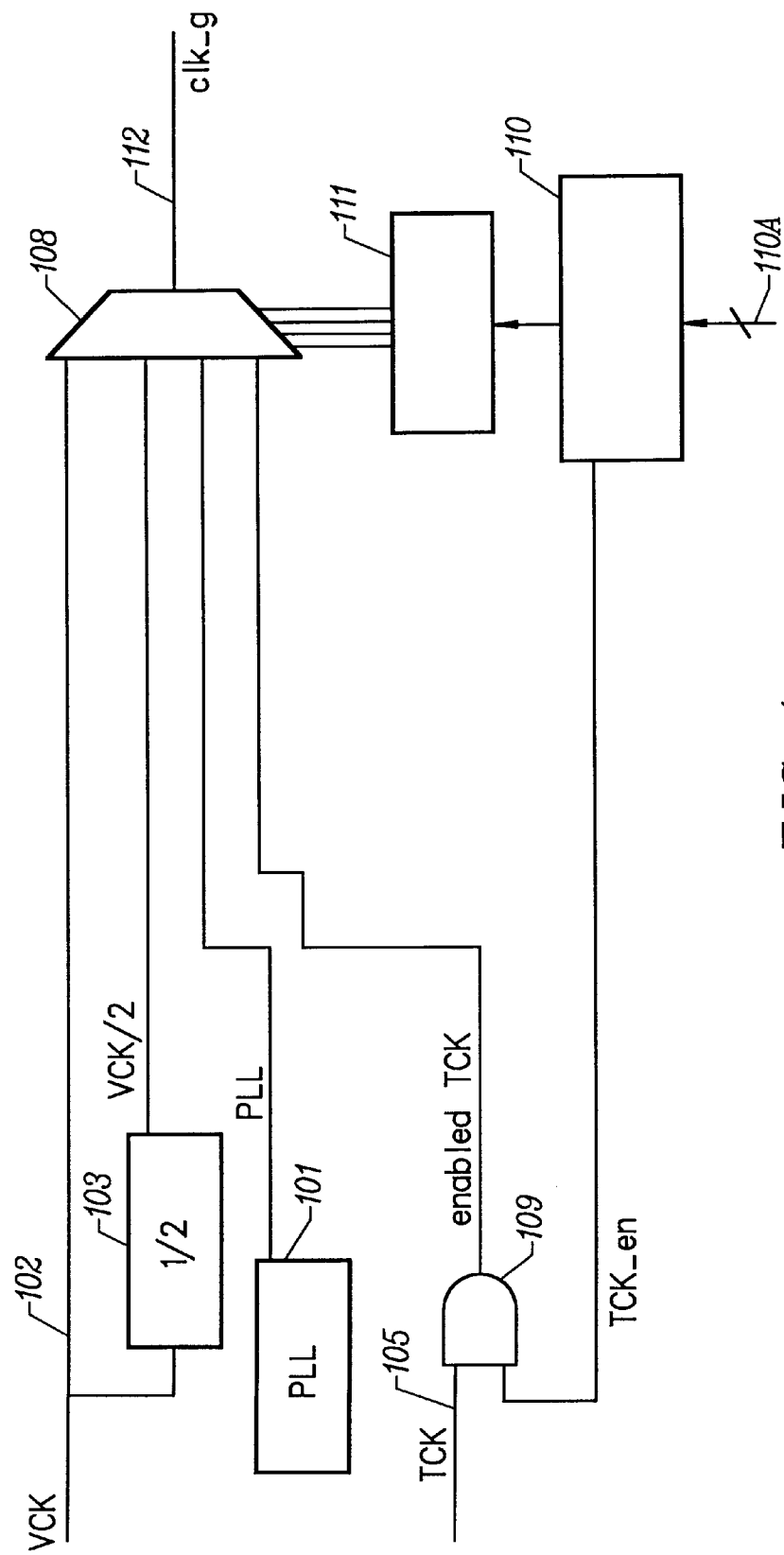
FIG. 1 is a block diagram of the hardware components associated with one embodiment of the invention.

FIG. 1 is a block diagram depicting one embodiment of this invention. Clock generation and control circuitry 100 includes a plurality of clock sources, including an on-chip phase lock loop (PLL) 101, which is used for normal operations of the integrated circuit, a VCK signal applied on lead 102 from an external source, such as a tester, which is used as a reference clock in the PLL and also used during debugging, a TCK signal received on lead 105 from an external source (per the IEEE standard 1149.1-1990) which is used for all JTAG controlled operations, and VCK/2, a clock signal derived when division circuit 103 divides the VCK signal by two, the VCK/2 signal is used for built in self test (BIST).

The TCK signal and the TCK enable signal (tck_en) are applied to the input leads of AND gate 109 to provide an enabled TCK signal on the output lead of AND gate 109. The VCK, PLL, enabled TCK and VCK/2 signals are applied to the input leads of multiplexer 108. Multiplexer 108 is controlled by VCTL controller 110 in order to select, via decoder 111, a desired one of the clock signals applied to its input leads. The resulting selected signal serves as output signal CLK_g on output lead 112. The output signal is used by an associated integrated circuit.

Figure 2:
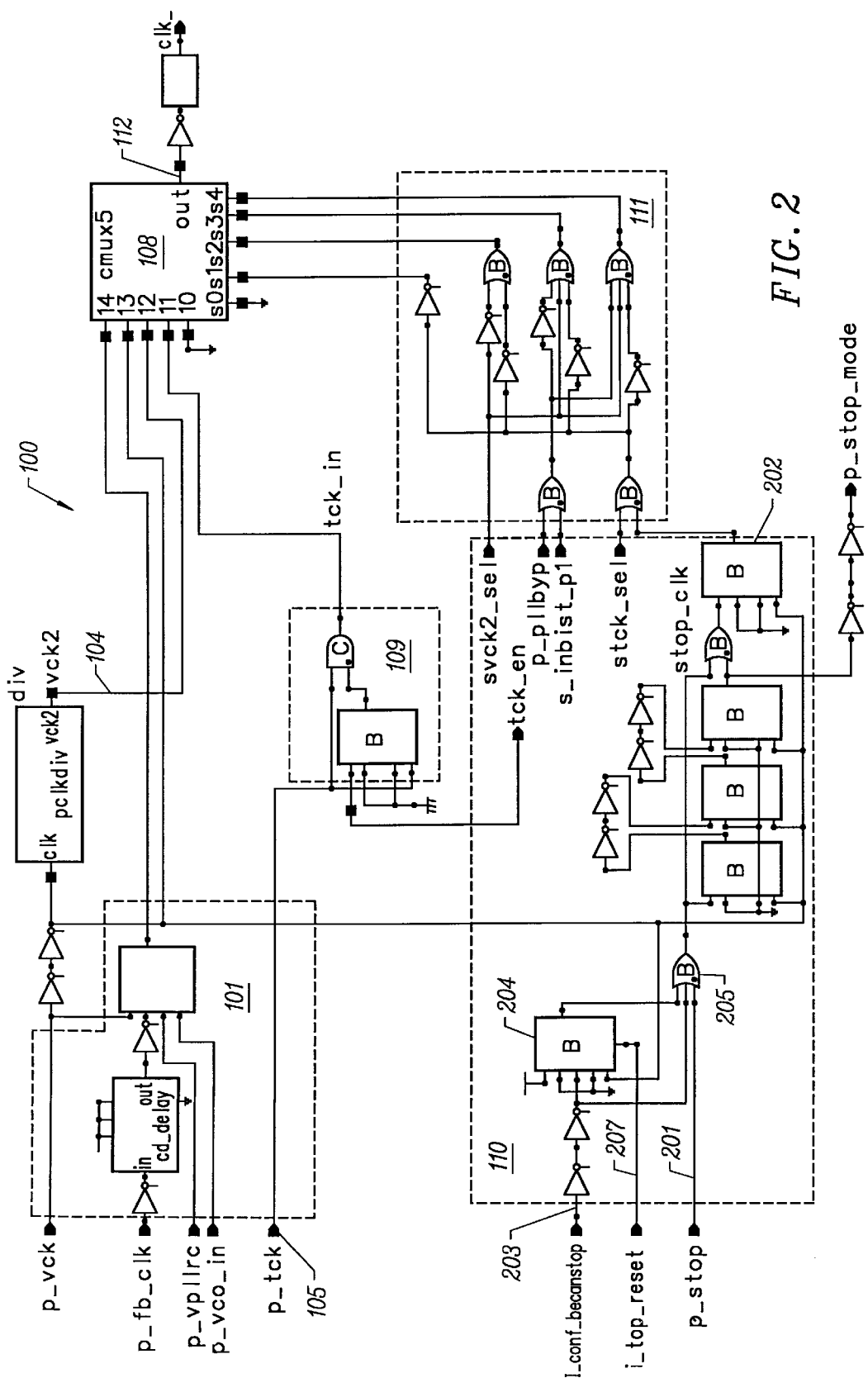
FIG. 2 is a schematic of the circuit of FIG. 1.

FIG. 2 is a schematic diagram of one embodiment of a clock generation and control circuit 100 constructed in accordance with the teachings of this invention. As shown in FIG. 2, clock generation control circuit 100 includes PLL 101, divide by 2 circuit 103, AND gate 109, multiplexer 108, decoder 111, and a plurality of signals derived from VCTL controller 110 (FIG. 1), including the following signals:

| Signal Name | Definition |
| --- | --- |
| tck_en | Enable TCK as clock source |
| svck2_SEL | Select + clock |
| p_pllbyp | PLL bypass clock |
| s_inbist_p1 | Status signal indicating BIST is running (force PLL bypass as the clock signal) |
| stck_sel | Select TCK |
| switchclk_1 | Select TCK |

In accordance with the teachings of this invention, an external pin (p_stop) and an IEEE 1149.1 instruction (bscan_stop) stops the free-running clock available from PLL 101. In addition, another IEEE 1149.1 instruction (issue_tck) issues any number of controlled clock pulses while the free-running clock is stopped. Multiplexer 108 selects for use as the integrated circuit internal clock a clock from one of several different sources, and VCTL controller circuitry 110 generates control signals which are decoded by decoder 111 in order to control multiplexer 108.

The operation of decoder 111 is as shown in the following Truth Table:

| Result | Inputs | | | | Outputs | | | |
| --- | --- | --- | --- | --- | --- | --- | --- | --- |
| switchclk_1 | svck2_sel | p_pllbyp | s_inbist_p1 | stck_sel | S1 | S2 | S3 | S4 |
| 1 | x | x | x | x | 1 | 0 | 0 | 0 |
| x | x | x | x | 1 | 1 | 0 | 0 | 0 |
| 0 | 1 | x | x | 0 | 0 | 1 | 0 | 0 |
| 0 | 0 | 1 | x | 0 | 0 | 0 | 1 | 0 |
| 0 | 0 | x | 1 | 0 | 0 | 0 | 1 | 0 |
| 0 | 0 | 0 | 0 | 0 | 0 | 0 | 0 | 1 |

The operation of the exemplary embodiment of FIG. 2 is as follows. The free-running clock is provided by PLL 101, with its input signals as follows:

| Signal Name | Definition |
| --- | --- |
| p_vck | VCK clock signal from external pin |
| p_fb_clk | PLL feedback signal |
| p_vpllrc | } external RC network connection |
| p_vco_in | |

In accordance with one feature of the invention, the free running internal clock provided by PLL 101 may be stopped by asserting a stop signal to a single pin (p_stop pin 201). Similarly, the free running internal clock can be restored by deasserting the same pin (if the clock was stopped by asserting the pin). Known prior art is only capable of stopping an internal clock through the use of several external pins, thus increasing the cost and complexity of prior art integrated circuits.

In accordance with the invention, the stop signal can be asserted and de-asserted asynchronously. This stop signal goes directly into the circuitry that selects different clock sources. The stop signal is passed by OR gate 205 and latched by falling edge flip flop 202, and the latched signal is applied to decoder 111 in order to cause multiplexer 108 to select a tck which is disabled by tck_en clock source. The three flops of the VCTL controller 110 are used to generate a delayed signal p_stop_mode, which becomes active AFTER clk_g is stopped. This signal indicates to the rest of the integrated circuit that the free running clock is now stopped, and the chip operates in "stop" mode. This signal must be activated after clk_g is stopped so as not to interrupt any normal operation to be performed by the last clock edge before stop mode. When returning to the original clock, the p_stop_mode signal is deasserted BEFORE clk_g returns. Thus any time STOP pin 201 is asserted, the internal clock stops at its low phase after just one falling edge of the free-running clock from either the PLL or the external clock pin (VCK). The clock (clk_g) stays at this low phase unless controlled clocks are generated or the STOP pin is deasserted.

Figure 3:
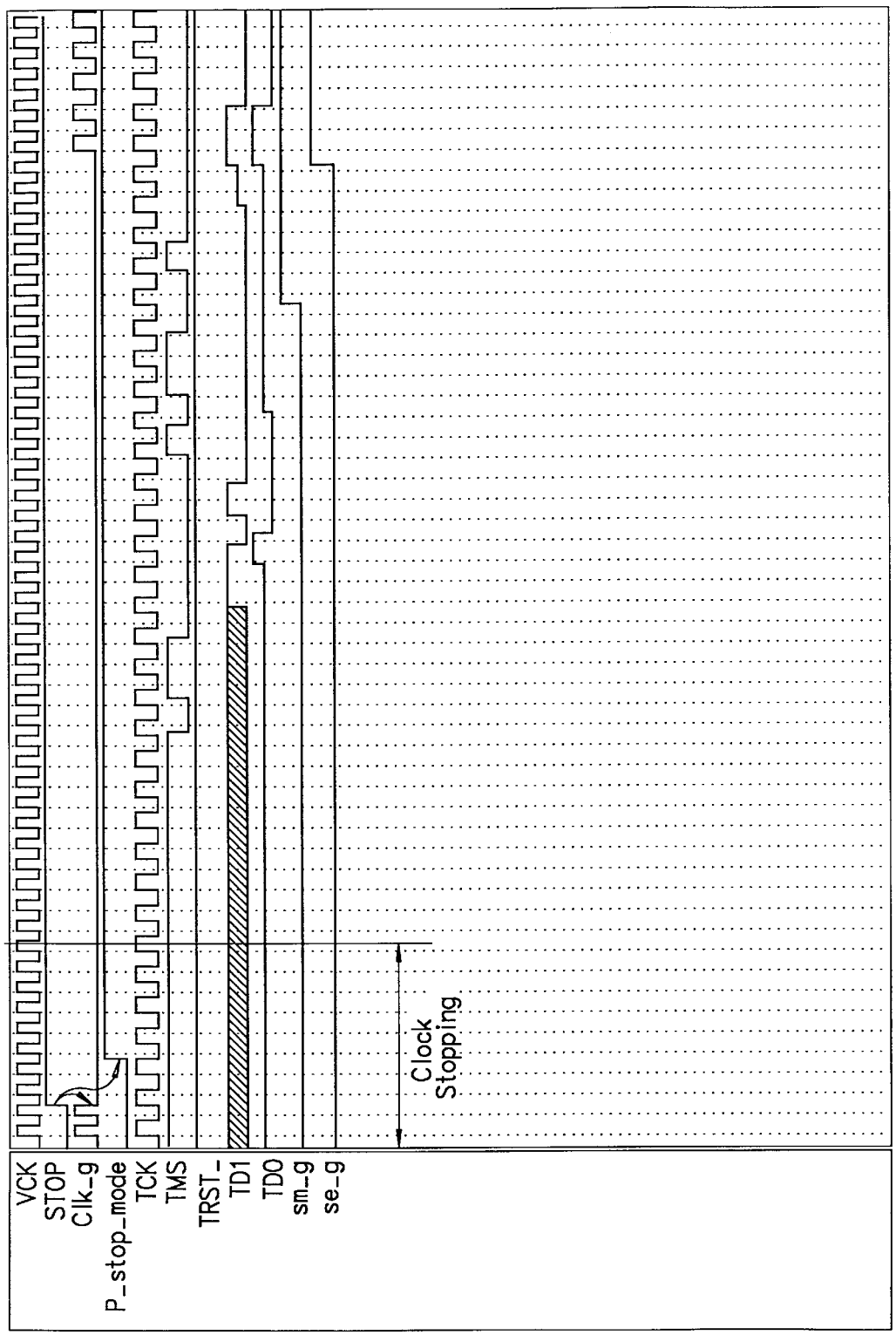
FIG. 3 is a timing diagram illustrating the stopping of an integrated circuit internal clock with a single command in accordance with one embodiment of the invention.
Figure 4:
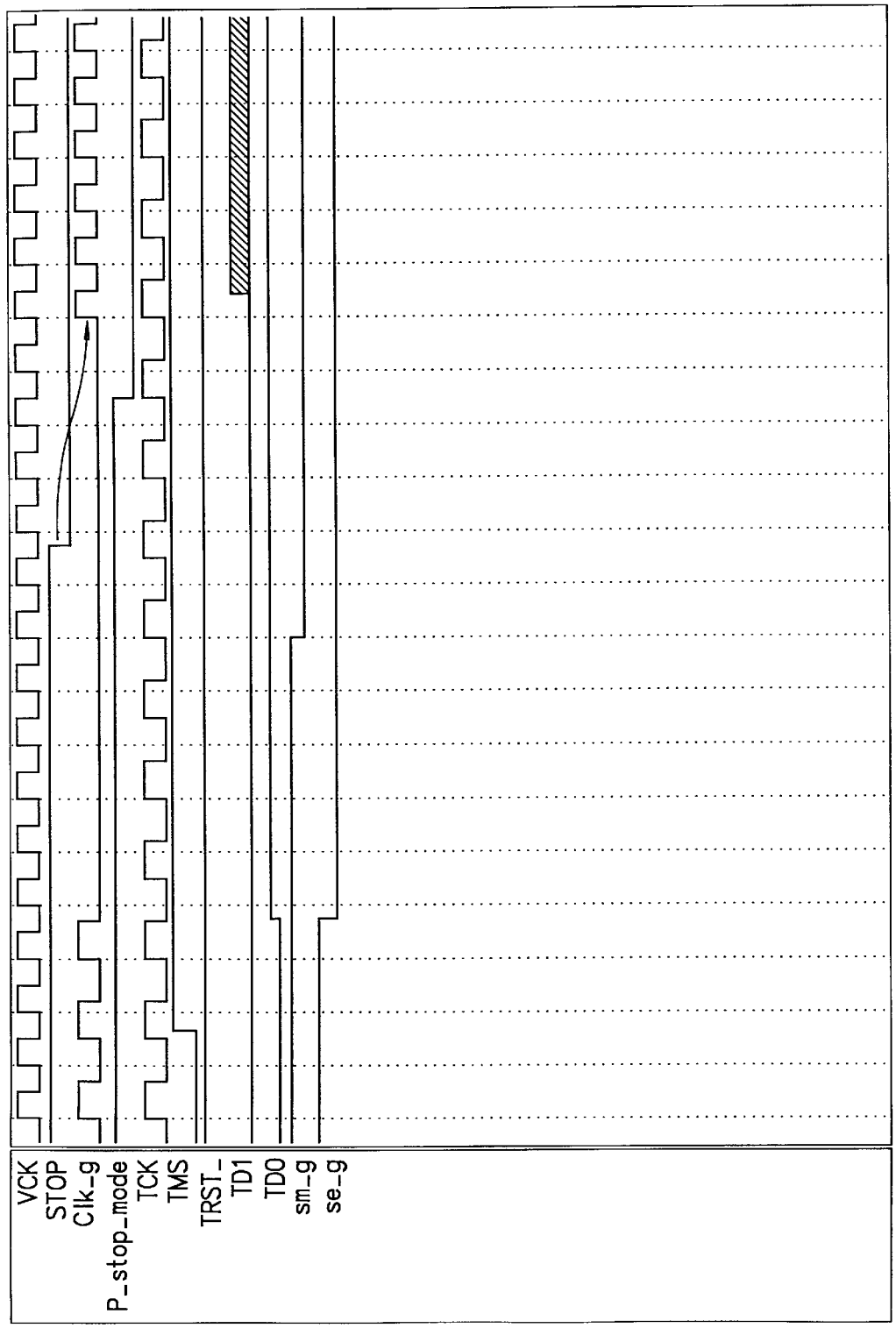
FIG. 4 is a timing diagram illustrating a stop mode for an integrated circuit internal clock in accordance with one embodiment of the invention.
Figure 5:
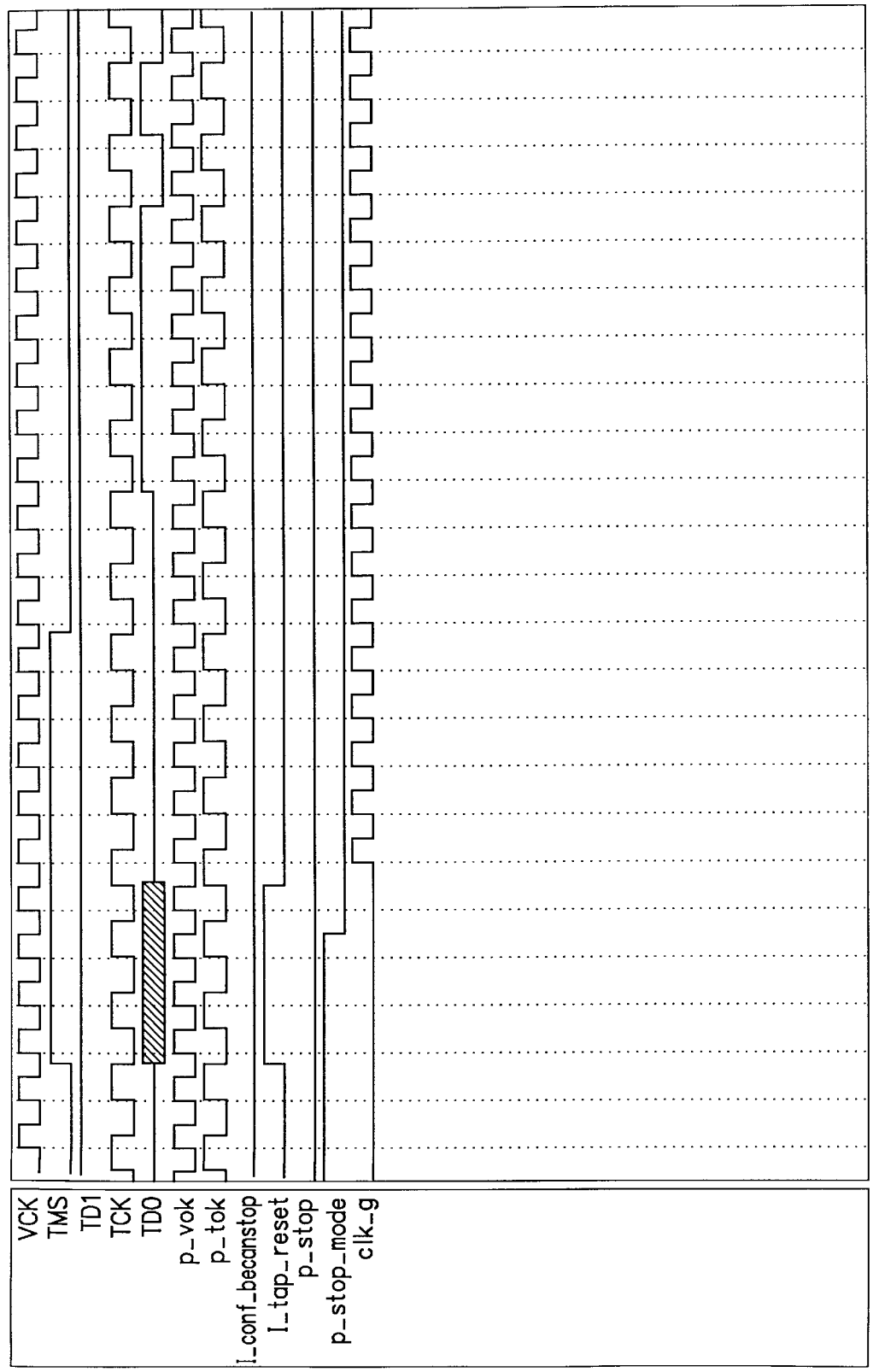
FIG. 5 is a timing diagram illustrating the restoration of an integrated circuit internal clock in accordance with one embodiment of the invention.

This operation is illustrated in FIG. 3. Note that the STOP signal is asserted and that the clk_g signal is then disabled at its falling edge. After a small delay, the p_stop_mode signal is asserted. The free-running internal clock can be resumed by deasserting the STOP pin, as illustrated in FIG. 4. The deassertion of STOP will force the multiplexer in FIG. 1 to select the original clock. The free running clock operation will then resume, as shown in FIG. 5.

One advantage of using the stop pin is that it results in a clock stop latency of less than one VCK cycle. This allows for the immediate stopping of the chip operation, and is critical in many chip debug situations. A general debug requirement is to freeze the error state as close to its source as possible. Stopping the clock immediately prevents the error from spreading to more circuits, or from being cleared by later operations. This requirement applies to any debug situation.

STOP pin 201 offers many possible ways to stop the free-running clock. When debugging different problems, the chip may need to be stopped when different situations arise. Therefore, a trigger condition can be generated for these conditions and connected to the STOP pin for clock stopping. One example of such a trigger condition is simply the tying of an error signal pin on the integrated circuit to the stop pin such that when an error condition occurs the stop pin is asserted. Another example is to decode output data from the integrated circuit such that when a particular data word is output, it is decoded in order to assert the stop pin. The STOP pin can also be connected to an external cycle counter so that the clock can be stopped at any cycle specified by the counter.

In addition to using a single STOP pin 201 to operate the the internal clock, the present invention allows a single command signal to be applied through a IEEE 1149.1 interface device. Specifically, the internal clock can be stopped by entering an IEEE 1149.1 instruction, bscan_ stop. The internal clock can then be restored by resetting the IEEE 1149.1 TAP controller (if the internal clock was stopped by the bscan_stop command).

In one embodiment of the invention, the instruction bscan_stop is received on lead 203 and applied to one input lead of OR gate 205, and thus stops the internal clock after one VCK falling edge, just as in the case with the p_stop signal on lead 201. The bscan_stop instruction is also latched into register 204 such that a latched bscan_stop signal is applied to another input lead of OR gate 205, causing the clock to remain stopped until register 204 is reset by an IEEE 1149.1 TAP controller reset (tap_reset) applied to lead 207. This operation is depicted in the timing diagram of FIG. 6.

Using the 1149.1 interface 110 allows for clock stopping in environments where physical control of the STOP pin is not possible. This makes it possible to perform debug operations on simple IEEE 1149.1 based testers and in systems where the chip is deeply embedded. This feature is critical in board and system environments. The use of the bscan_stop signal also facilitates the use of any external IEEE 1149.1 controller to manipulate the chip internal clock. As a result, testing does not require special hardware or software.

Figure 6:
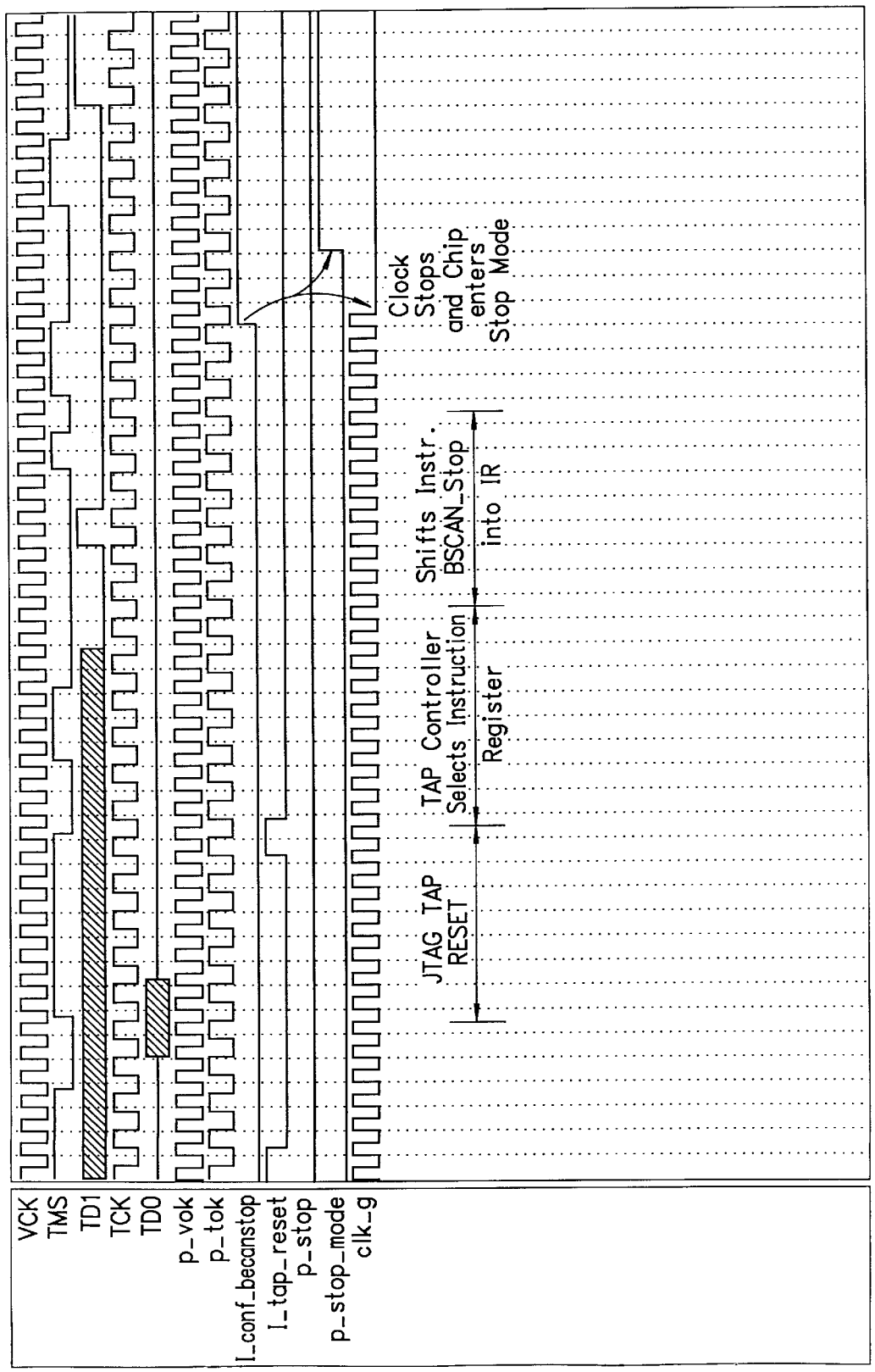
FIG. 6 is a timing diagram illustrating the stopping of an integrated circuit internal clock with an IEEE 1149.1 command in accordance with one embodiment of the invention.

As shown in FIG. 6, if the original clock was stopped via the IEEE 1149.1 interface, then it can be resumed by moving the TAP controller to the Test-Logic-Reset state (asserting I_tap_reset). This will deassert the signal equivalent to STOP and thereby force the multiplexer to select the original clock (clk_g activated).

After clk_g is stopped, many debug operations can be performed. For instance, the integrated circuit can enter internal scan mode, relying upon IEEE 1149.1 protocols. The scan chain, which contains the state of all scannable flip flops in the cycle when the stop mode is activated, is shifted out to the tester. Then, depending on the situation, either the same signals or a set of modified signals are shifted back into the scan chain. After the scan chain shifting is completed, the stop mode is terminated and-normal operation can be resumed. Since the circuit is operated by the VCK signal in normal operation and by the TCK signal in scan operation, the clk signal switches between VCK and TCK in stop mode operation.

Stop mode can be enabled in every VCK cycle so that a test can be stepped through with all the internal flip-flop states known to the outside. For any VCK cycle, the cycle time can be adjusted on the tester to test for timing problems between cycles. This is also called clock-stretching, and can be very useful in debugging speed problems.

Figure 7:
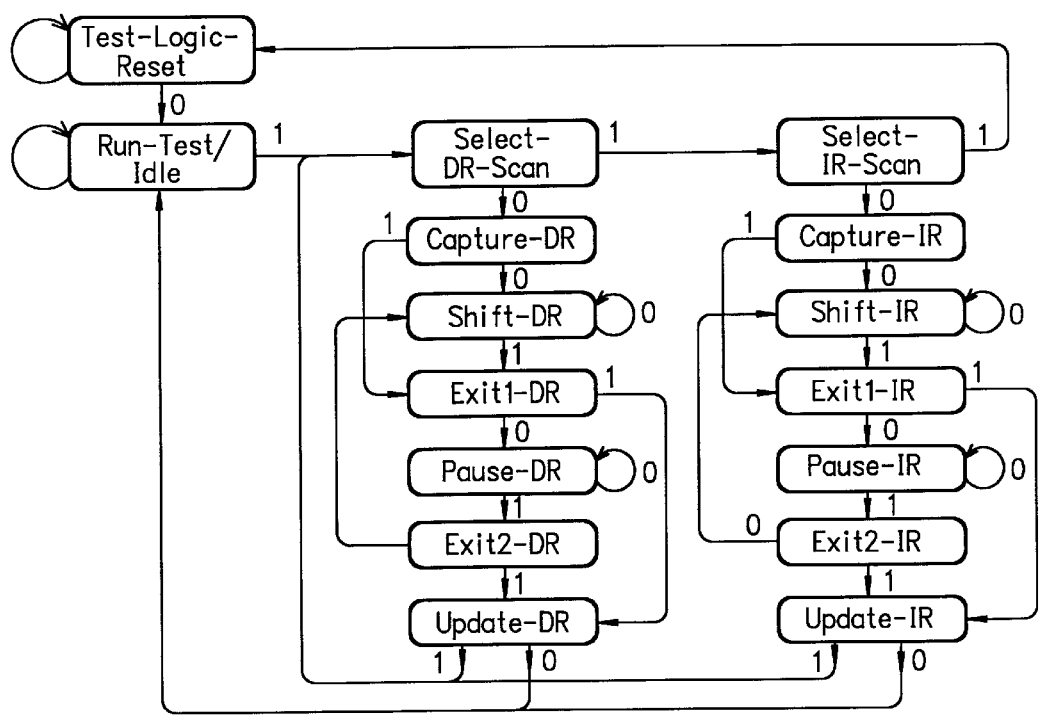
FIG. 7 illustrates a TAP controller state diagram that characterizes a TAP controller that may be used in accordance with the invention.

FIG. 7 depicts one embodiment of an IEEE 1149.1 TAP controller state diagram known in the art and suitable for use with the present invention. Changes in state within the state diagram of FIG. 7 are made by changes in the logical state of the TCK and TMS signal. The TRST signal serves to return the state machine from any state to the test-logic-reset state. In order to stop the clock via an IEEE 1149 instruction, the TAP controller is moved from the Test-Logic-Reset state, where it usually resides during normal chip operation, to the Shift-IR state, and the bscan_stop instruction is shifted in. Then the TAP controller is moved to the Idle state, passing through the Update-IR state. The instruction register is updated on the TCK falling edge while the TAP controller is in the Update-IR state.

While the free-running internal clock is disabled, the clock controller can issue a controlled clock as the chip internal clock. The number of clock cycles to issue is determined by the user and can be any integer number. After the desired number of clocks are issued, the internal clock returns to the disabled state, waiting for more controlled clock cycles or to be restored to the free-running clock.

Figure 8:
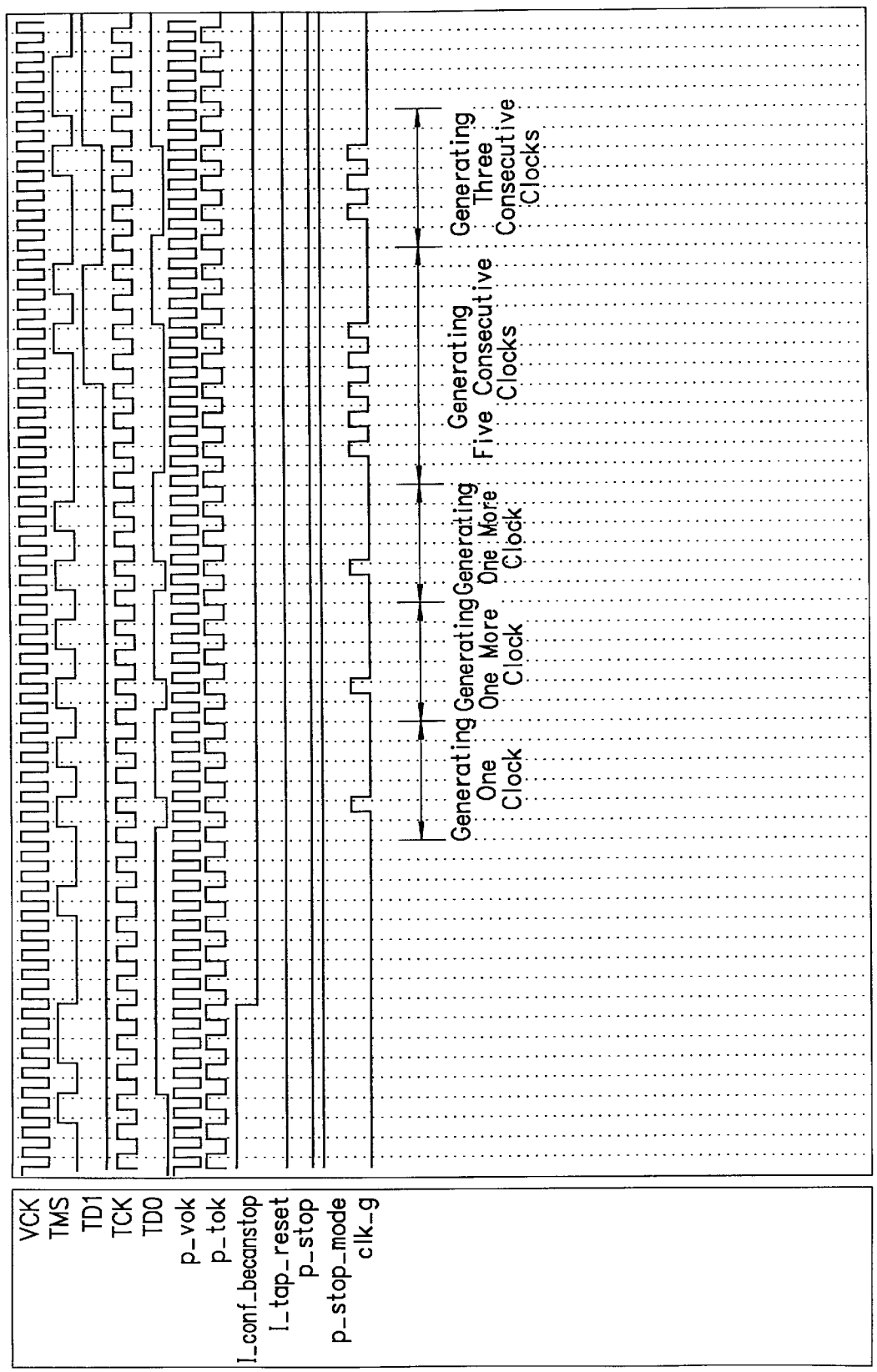
FIG. 8 is a timing diagram illustrating the generation of controlled clock pulses in accordance with one embodiment of the invention.

The controlled clocks are issued through the IEEE 1149.1 controller. A special IEEE 1149.1 instruction is used specifically for this purpose. This instruction, called ISSUE_ TCK, does not access any scan data register. Instead, once it is entered into the IEEE 1149.1 instruction register, it selects (but does not enable) the TCK pin to be the internal clock. When the IEEE 1149.1 TAP controller is moved to the Shift-DR state, the TCK clock is enabled and passed to the internal clock. The internal clock will be active and identical to TCK for all TCK cycles when the TAP controller is in the Shift-DR state. Once the TAP controller leaves the Shift-DR state, (by changing the TMS pin), the internal clock will be disabled. More clocks can be issued again if the TAP comes back to Shift-DR as long as the instruction is still an enabled TCK signal. The scheme described here allows for the control of an exact number of clock cycles without glitches. FIG. 8 illustrates how this feature operates.

Generating the controlled internal clock via IEEE 1149 also provides great flexibility in clock manipulation for a chip embedded in a system, since the IEEE 1149.1 controller for the system can be conveniently used as both the controller and generator of the controlled clock. There is no need for a separate clock generator.

This invention uses the TCK clock provided by IEEE 1149.1 as the controlled clock source. This avoids the need for a separate clock source that may not be easily available, either on chip or off chip. As a result, the invention does not require the on-chip PLL to continue to be phase-locked since it is not used as the source for the controlled clock.

Figure 9:
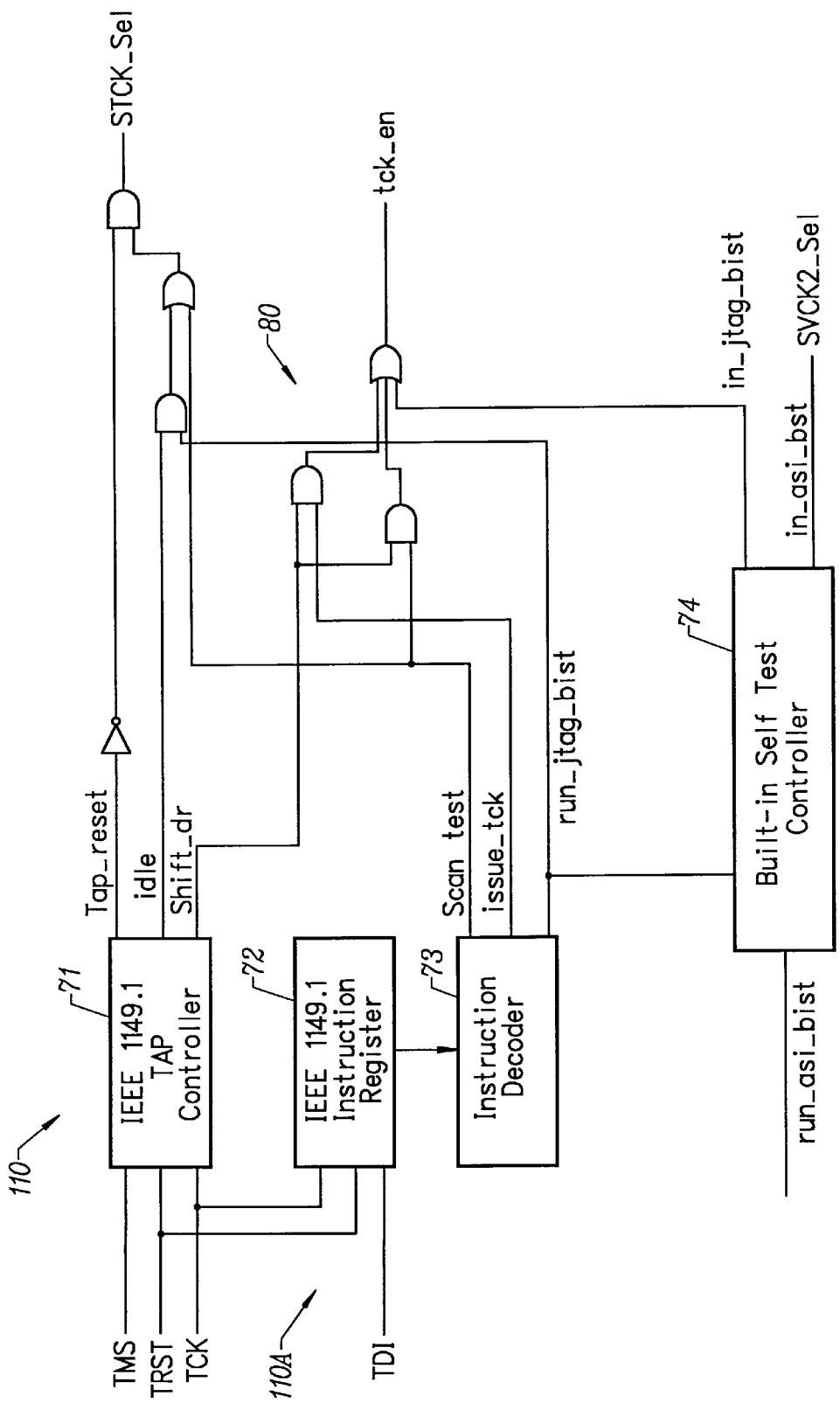
FIG. 9 is a block diagram of one embodiment of a VCTL controller in accordance with one embodiment of the invention.

FIG. 9 is a block diagram of one embodiment of a VCTL controller 110 suitable for use with this invention. The VCTL controller 110 includes control signal bus 110A receiving the following input signals.

| Input Signal Name | Definition |
| --- | --- |
| TMS | IEEE 1149.1 test mode select |
| TRST | IEEE 1149.1 reset |
| TCK | IEEE 1149.1 TCK clock |
| TDI | IEEE 1149.1 test data input |
| run_asi_bist | Initiate built in self test |

VCTL controller 110 includes a tap controller 71 formed in accordance with the IEEE 1149.1 standard, as is well known in the art. Controller 110 also includes an IEEE 1149.1 instruction register 72 as well as an instruction decoder 73, also well known in the art. Built in self test controller 74 is constructed in order to perform the various self test operations for the integrated circuit in which this invention is placed. In operation, VCTL controller 110 receives the TMS, TRST, and TCK signals, which control IEEE tap controller 71 in order to provide intermediate signals tap_reset, idle, and shift_dr which are applied to logic circuit 80 in order to generate the output signals in conjunction with other intermediate signals provided by instruction decoder 73 and responds to the selection of an appropriate instruction from IEEE instruction register 72. The resulting output signals are as follows:

| Output Signal Name | Definition |
| --- | --- |
| STCK_sel | Select TCK clock |
| TCK_en | Enable TCK clock |
| IN_JTAG_bist | Status signal: JTAG initiated built in self test is running |
| in_asi_bist | Status signal: externally initiated built in self test is running (select divided by 2 clock) |
| bscan_stop | Stop clock |

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A clock generation and control circuit of an integrated circuit, comprising:
   a control circuit to generate a set of control signals responsive to a stop signal applied to a single external pin of said integrated circuit;
   a decode circuit connected to said control circuit to generate a select signal from said set of control signals;
   a plurality of input lines carrying a corresponding plurality of clock signals from external or internal clock sources; and
   a multiplexer connected to said plurality of input lines and said decode circuit, said multiplexer responding to said select signal to select a disabled output clock signal from said plurality of clock signals so that a debug operation can be performed on said integrated circuit while said output clock signal is disabled.

2. The clock generation and control circuit of claim 1 wherein said external pin is a p_stop pin and said stop signal is a bscan_stop signal, as specified by IEEE standard 1149.1.

3. The clock generation and control circuit of claim 1 wherein said plurality of clock signals are specified in accordance with IEEE standard 1149.1 and include at least one signal selected from the group of signals including: a VCK signal, a VCK/2 signal, a phase-locked loop signal, and a TCK signal.

4. The clock generation and control circuit of claim 1 wherein said control circuit generates said control signals in accordance with IEEE Standard 1149.1.

5. The clock generation and control circuit of claim 4 wherein said control signals include at least one signal selected from the group including: a switchckl_1 signal, a svck2_sel signal, a p_pllbyp signal, a s_inbist_p1 signal, and a stck_sel signal.

6. The clock generation and control circuit of claim 1 wherein said control circuit further generates a stop mode signal indicating that said disabled clock signal is selected.

7. The clock generation and control circuit of claim 1 wherein said control circuit generates said control signals responsive to a scan stop signal generated through a test access port of said integrated circuit, as specified by a boundary scan test protocol.

8. A clock generation and control circuit to debug an integrad circuit, comprising:
   a control circuit to generate a set of control signals responsive to a scan stop signal generated through a test access port of said integrated circuit, as specified by a boundary scan test protocol;
   a decode circuit connected to said control circuit to generate a select signal from said set of control signals;
   a plurality of input lines carrying a corresponding plurality of clock signals from external or internal clock sources; and
   a multiplexer connected to said plurality of input lines and said decode circuit, said multiplexer responding to said select signal to select a disabled output clock signal from said plurality of clock signals so that a debug operation can be performed on said integrated circuit while said output clock signal is disabled.

9. The clock generation and control circuit of claim 8 wherein said boundary scan test protocol is IEEE 1149.1.

10. The clock generation and control circuit of claim 8 wherein said plurality of clock signals are specified in accordance with IEEE standard 1149.1.

11. The clock generation and control circuit of claim 10 wherein said plurality of clock signals include at least one signal selected from the group of signals including: a VCK signal, a VCK/2 signal, a phase-locked loop signal, and a TCK signal.

12. The clock generation and control circuit of claim 8 wherein said control circuit generates said control signals in accordance with IEEE Standard 1149.1.

13. The clock generation and control circuit of claim 12 wherein said control signals include at least one signal selected from the group including: a switchckl_1 signal, a svck2_sel signal, a p_pllbyp signal, a s_inbist_p1 signal, and a stck_sel signal.

14. A method of constructing a clock generation and control circuit for debugging an integrated circuit, said method comprising the steps of:

providing a control circuit to generate a set of control signals selectively responsive to a stop signal applied to a single external pin of said integrated circuit, and a scan stop signal generated through a test access port of said integrated circuit, as specified by a boundary scan test protocol;

providing a decode circuit connected to said control circuit to generate a select signal from said set of control signals;

providing a plurality of input lines carrying a corresponding plurality of clock signals from external or internal clock sources; and providing a multiplexer connected to said plurality of input lines and said decode circuit, said multiplexer responding to said select signal to select a disabled output clock signal from said plurality of clock signals so that a debug operation can be performed on said integrated circuit while said output clock signal is disabled.

15. The method of claim 14 further comprising the step of issuing a set of controlled clock pulses while said output signal is disabled.

16. The method of claim 14 further comprising the step of providing a stop mode signal indicating that said disabled clock signal is selected.

17. A method of debugging an integrated circuit through the use of a clock generation and control circuit, said method comprising the steps of:

selecting a disabled output clock signal from a plurality of clock signals in response to a select command, said selecting step including the steps of alternately selecting said disabled output clock signal in response to a stop signal applied to a single external pin of said integrated circuit, and a scan stop signal generated through a test access port of said integrated circuit; and executing a set of debug operations while said output clock signal is disabled.

18. The method of claim 17 further comprising the step of issuing a set of controlled clock pulses while said output signal is disabled.

19. The method of claim 18 wherein said issuing step is initiated with an issue_tck signal.

20. The method of claim 17 wherein said external pin is a p_stop pin and said stop signal is a bscan_stop signal, as specified by IEEE standard 1149.1.

* * * * *